(12) United States Patent
Bolshtyansky

(10) Patent No.: US 11,785,364 B2
(45) Date of Patent: Oct. 10, 2023

(54) SELF-HEALING SUBMARINE LINKS

(71) Applicant: SUBCOM, LLC, Eatontown, NJ (US)

(72) Inventor: Maxim A. Bolshtyansky, Millstone, NJ (US)

(73) Assignee: SUBCOM, LLC, Eatontown, NJ (US)

( * ) Notice: Subject to any disclaimer, the term of this patent is extended or adjusted under 35 U.S.C. 154(b) by 0 days.

(21) Appl. No.: 17/541,501

(22) Filed: Dec. 3, 2021

(65) Prior Publication Data

US 2023/0115789 A1 Apr. 13, 2023

Related U.S. Application Data

(60) Provisional application No. 63/255,418, filed on Oct. 13, 2021.

(51) Int. Cl.
*H04B 10/03* (2013.01)
*H04Q 11/00* (2006.01)

(52) U.S. Cl.
CPC . *H04Q 11/0066* (2013.01); *H04Q 2011/0073* (2013.01); *H04Q 2011/0081* (2013.01)

(58) Field of Classification Search
CPC ................................ H04B 10/03; H04B 10/80
See application file for complete search history.

(56) References Cited

U.S. PATENT DOCUMENTS

| | | | | |
|---|---|---|---|---|
| 5,838,477 A | * | 11/1998 | Yamamoto | G02B 6/29383 398/179 |
| 7,274,869 B1 | * | 9/2007 | Pan | H04B 10/032 398/19 |
| 10,771,179 B1 | * | 9/2020 | Marcenac | H04B 10/25891 |
| 2003/0102212 A1 | * | 6/2003 | Watson | G02B 6/4428 204/297.11 |
| 2009/0028500 A1 | * | 1/2009 | Lin | G02B 6/43 385/17 |
| 2013/0259475 A1 | * | 10/2013 | Ji | H04L 12/28 398/48 |
| 2020/0033542 A1 | * | 1/2020 | Garrett | H04J 14/0221 |
| 2020/0328811 A1 | * | 10/2020 | Mertz | H04J 14/02 |
| 2022/0085896 A1 | * | 3/2022 | Yaman | H04B 10/80 |

FOREIGN PATENT DOCUMENTS

EP 3890219 A1 10/2021
WO 2020194842 A1 10/2020

OTHER PUBLICATIONS

European Search Report and Written Opinion for the Application No. EP22192598, dated Mar. 9, 2023, 12 pages.

* cited by examiner

*Primary Examiner* — Shi K Li
(74) *Attorney, Agent, or Firm* — KDW Firm PLLC

(57) ABSTRACT

Provided are optical communication signal recovery techniques and a submarine optical communication recovery device may include a number of inputs, a number of outputs and a number of optical switch modules. Each input may be operable to connect to a respective optical fiber of a submarine fiber optic cable, and a number of the optical fibers carry optical signals and at least one optical fiber of the plurality of optical fibers is an unusable optical path that is unable to carry a usable optical signal. Each output may couple to another respective optical fiber, and a number of the outputs may be designated as impaired outputs. Each optical switch module of the number of optical switch modules may be operable to connect an input of the number of inputs coupled to the unusable optical path to an impaired output of the number of the impaired outputs.

19 Claims, 11 Drawing Sheets

Yx1bxY 1000a

| Y | # OF SWITCHES |
|---|---|
| 2 | 1 |
| 4 | 5 |
| 8 | 13 |
| 16 | 29 |
| 32 | 61 |

*FIG. 10A*

Zx2bxZ 1000b

| Z | # OF SWITCHES |
|---|---|
| 4 | 8 |
| 8 | 24 |
| 16 | 56 |
| 32 | 120 |

*FIG. 10B*

SELF-HEALING SUBMARINE LINKS

CROSS-REFERENCE TO RELATED APPLICATION

The present application claims priority to U.S. Provisional patent application No. 63/255,418, filed Oct. 13, 2021, entitled "SELF-HEALING SUBMARINE LINKS", which is incorporated by reference herein in its entirety.

BACKGROUND

Long-haul optical communication systems, such as submarine optical communication systems, generally suffer from signal attenuation resulting from a variety of factors, including scattering, absorption, and bending. To compensate for attenuation, these long-distance systems may include a series of optical amplifiers that are spaced along a signal transmission path and configured to amplify or boost the optical signal in a manner that allows reliable detection at a receiver. Depending on the length of the transmission path (e.g., 500 km or the like), the number of optical amplifiers positioned along the path (and lengths therebetween) may vary.

The cost of repeaters is a large contributor to the overall cost of a submarine optical cable system, especially for large capacity links. Most amplifiers used in submarine optical communication systems have high reliability. The reliability of the submarine amplifiers is usually 5 to 10 times more reliable than amplifiers used in terrestrial optical communication systems. The use of the lower reliability, terrestrial erbium-doped fiber amplifier (EDFAs) and of semiconductor optical amplifiers (SOA) in a submarine optical cable system may lead to miniaturization and lower costs. However, these types of amplifiers contain in-signal-line unreliable components. A solution to the unreliability of these types of amplifiers is to double the number of amplifiers for redundancy but this leads to more than doubling the size and costs. In addition, some implementations may require shutdown amplifiers which requires components capable of communicating to be included with such a solution that add expense and require additional power.

Moreover, in the case of an EDFA, laser pumps are the least reliable component. The laser pumps can be either considered to be a part of the amplifier in which a single pump failure means amplifier failure, or the laser pumps may be separately multiplexed to increase reliability, as it is commonly done.

It would be beneficial and advantageous to have a submarine optical communication system topology that increases reliability by redundancy but does not lead to either doubling of the number of amplifiers or requires less switches.

SUMMARY

In an aspect, a submarine optical communication recovery device is provided. The submarine optical communication recovery device may include a number of inputs, a number of outputs and a number of optical switch modules. Each input of the number of inputs may be operable to connect to a respective optical fiber of a number of optical fibers of a submarine fiber optic cable, and a portion of the number of optic fibers carry optical signals and at least one optical fiber of the plurality of optical fibers belongs to unusable optical path unusable optical path that is unable to carry a usable optical signal due, for example, to failure of some optical component in that path. Each output of the number of outputs may couple to another respective optical fiber, and a number of the outputs may be designated as impaired outputs. Each optical switch module of the number of optical switch modules may be operable to connect an input of the number of inputs coupled to the unusable optical path to an impaired output of the number of the impaired outputs.

In another aspect, a submarine optical communication signal repeater is provided that may include a housing, an optical communication signal repeater, and a submarine optical communication recovery device. The optical communication signal repeater may be operable to couple to respective fiber optic cable segments of a number of fiber optic cable segments and be operable to amplify a respective optical signal transmitted by a respective optical fiber of the plurality of optical fibers. The housing may contain the optical communication signal repeater and the submarine optical communication recovery device. The submarine optical communication recovery device may include a number of optical switch modules and may be operable to connect, in response to an optical communication signal failure in at least one optical fiber in a respective fiber optic cable segment, the at least one optical fiber to an output of an optical switch module of the plurality of optical switch modules. The output of the optical switch module may be designated as an impaired output.

In a further aspect, an optical communication recovery system is provided that includes a fiber optic cable communication pathway, a first optical signal repeater section, and a submarine optical communication recovery device. The fiber optic cable communication pathway may include a number of fiber optic cable segments. Each fiber optic cable segment may be operable to transmit optical data signals that may include communication data signals and supervisory data signals. At least one fiber optic cable segment of the plurality of fiber optic cable segments may include an unusable optical path. The first optical signal repeater section may be coupled between a respective first segment and a respective second segment of the plurality of the fiber optic cables segments of the fiber optic cable communication pathway. The first optical signal repeater section may include a first set of connections and a second set of connections coupled to a respective set of amplifiers. The submarine optical communication recovery device may have a number of inputs and a number of outputs, where the submarine optical communication recovery device is operable to connect to an unusable optical path to an input of the plurality of inputs and couple the unusable optical path to an impaired output of a plurality of outputs of the submarine optical communication recovery device.

BRIEF DESCRIPTION OF THE DRAWINGS

FIG. 10A illustrates a table for determining a number of optical switches based on a number of inputs according to an embodiment.

FIG. 10B illustrates another table for determining a number of optical switches based on a number of inputs according to another embodiment.

DETAILED DESCRIPTION

The following describes examples of a submarine optical communication recovery device, an optical communication recovery system and techniques that enable a response to an optical communication signal failure within a repeater device and provide the above described advantages of less amplifiers and fewer optical switches.

Figure 1A:
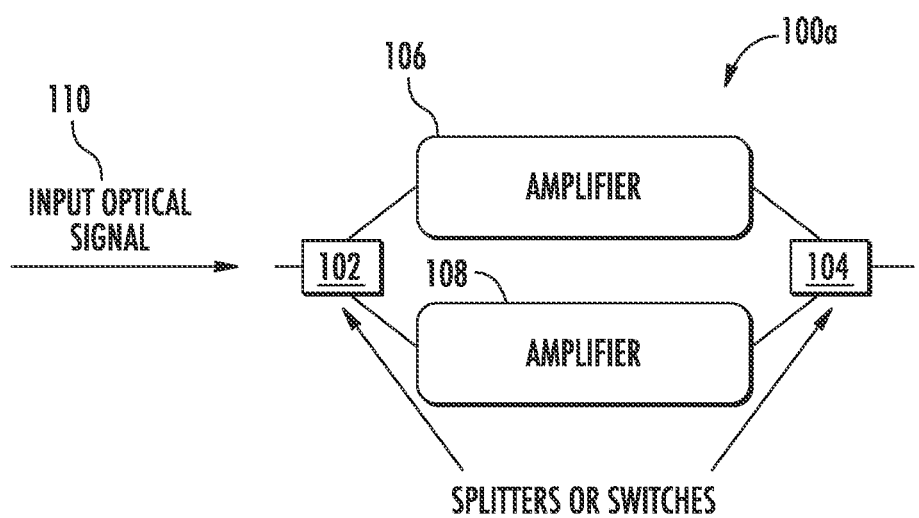
FIG. 1A illustrates an example of redundant amplifiers to facilitate optical communication recovery.

FIG. 1A illustrates an example of redundant amplifiers to facilitate optical communication recovery. The redundant amplifier arrangement 100*a* includes a pair of amplifiers 106 and 108 and a pair of switches or splitters 102 and 104. As the shown the redundant amplifier arrangement 100*a* utilizes two switches and requires 100% overhead due to requiring a redundant amplifier (e.g., amplifier 108) as well as two switches 102 and 104 to provide recovery of the optical communication signal 110.

The switches or splitters 102 and 104 may inherently loss, such as −3 dB or the like. In operation, the switch or splitter 102 may be configured to pass input optical signal 110 through amplifier 106 and switch or splitter 104 may be configured to receive the amplified optical signal from the amplifier 106 and output the amplified signal. In response to a failure of amplifier 106, switches or splitters 102 and 104 may be configured to redirect the input optical signal 110 to amplifier 108 for amplification and output from splitter or switch 104, thereby recovering from the failure of amplifier 106.

Requiring multiple amplifiers, such as 106 and 108 and multiple optical switches, such as 102 and 104, makes the redundant amplifier arrangement 100*a* expensive to implement and maintain. Better solutions are available to reduce cost as well as reducing the number of components to be used thereby improving overall reliability due to reducing the number of components that may fail. The following examples describe improved submarine optical communication recovery devices, arrangements, techniques and systems.

Figure 1B:
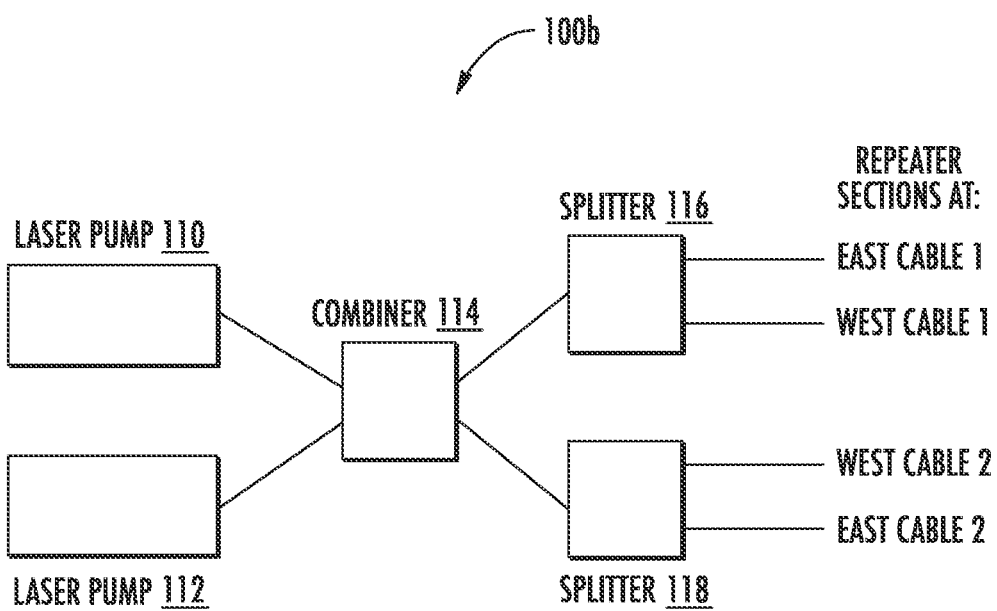
FIG. 1B illustrates an optical pump unit usable to provide modulated laser light to amplifiers in a repeater section as described herein.

FIG. 1B illustrates an optical pump unit usable to provide modulated laser light to amplifiers in a repeater section as described herein. The optical pump unit 100*b* is an example of a laser arrangement usable in an optical communication repeater as described herein.

In the example of FIG. 1B, the optical pump unit 100*b* includes a pair of laser pumps 110 and 112, a combiner 114, and splitters 118 and 116. Each of the laser pumps 110 and 112 may output light at the same wavelength and power. The combiner 114 combines the output of the laser pumps 110 and 112 to provide a beam of light suitable for use by an optical amplifier. The beam of light is output from the combiner 114 to splitters 116 and 118. Splitter 116 may split the beam of light output from the combiner 114 into two additional beams that are output to repeater sections along a first optical communication cable heading, for example, to the East (e.g., East cable 1) and to a second optical communication cable heading, for example, to the West (e.g., West cable 1). Splitter 118 may split the beam of light output from the combiner 114 into two additional beams that are output to other repeater sections along the first optical communication cable heading, for example, to the East (e.g., East cable 2) and to a second optical communication cable heading, for example, to the West (e.g., West cable 2).

The optical pump unit 100*b* is an example of another component in addition to an amplifier, such as amplifiers 106 and 108, of an optical communication repeater that may fail. As a result of the failure of any component within an optical communication repeater, the optical communication signals may not be transmitted at full power or may not be transmitted at all. This optical communication signal failure results in the affected optical fiber of the submarine fiber optic cable being an unusable optical path (i.e., unusable to transmit optical communication signals or supervisory signals).

The optical pump unit 110*b* implementation provides an optical power for optical signal amplification to the optical communication system. The optical pump unit 100*b* may be used in multiple different configurations based upon the number of optical fibers in a fiber optic cable or the like, so multiple laser pumps may be operable to provide optical power for amplifying the inputted optical communication signals. For example, while a two laser—four output optical pump unit (OPU) configuration is shown, other configurations are also possible such as a four laser—four output configuration or the like.

Figure 2A:
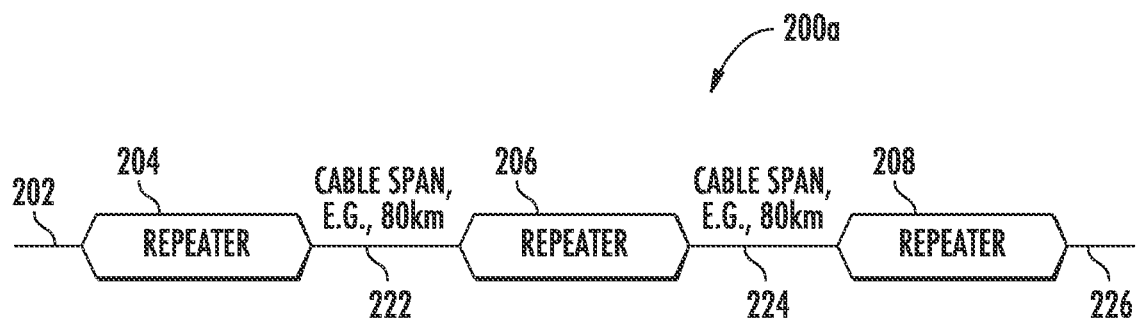
FIG. 2A illustrates an example of a multiple repeater section of a fiber optic cable communication pathway.

FIG. 2A illustrates an example of a multiple repeater section of a fiber optic cable communication pathway. The multiple repeater section 200*a* includes optical communication repeaters 204, 206 and 208 and fiber optic cable segments 202, 222, 224 and 226. The fiber optic cable segments 202, 222, 224 and 226 may form a fiber optical cable communication pathway. Each of the fiber optic cable segments 202, 222, 224 and 226 may span a long distance between the respective optical communication repeaters, such as 60 kilometers (km), 80 km or even 100 km. Of course, shorter and longer distances may also be accommodated. Each respective optical communication repeater 204, 206 and 208 may include multiple amplifiers, such as amplifier 106 or amplifier 108, in various arrangements and may also include optical pump units, such as optical pump unit 100*b*, if needed. The optical communication repeaters 204, 206 and 208 may be substantially evenly spaced from one another (e.g., 60 or 80 km apart).

The fiber optical cable communication pathway may be part of a submarine fiber optic cable that is part of a communication system that traverses oceans, seas, rivers and the like. Each of the fiber optic cable segment may include multiple optical fibers that are operable to carry optical communication signals and/or optical supervisory signals in a submarine fiber optic cable. The number of optical fibers in the submarine fiber optic cable may be 4, 8, 16, 24 or 32 optical fibers, or even greater.

Each of the repeaters 204, 206 and 208 may include an amplifier for each optical fiber within the respective fiber optic cable segments 202, 222, 224 and 226 in order to amplify the respective optical signals (e.g., optical communication signals and/or optical supervisory signals) over the distance between each respective repeater. A failure of any amplifier in one of the repeaters 204, 206, or 208 may result in an optical communication signal failure. An optical communication signal failure may be identified as an optical communication signal that does not meet the optical signal specifications of the optical communication system. The optical signal specifications of the optical communication system for the respective optical signals may include a power level, a frequency range, a guard band range and the like. Alternatively, or in addition, a failure may be considered as a failure of an optical fiber pathway. The optical fiber pathway may be the same fiber that may include multiple amplifiers and/or multiple OPU failures on a single designated optical fiber between submarine optical communication recovery devices in the optical fiber pathway. The optical fiber pathway may include multiple repeater sections, which contain multiple amplifiers and/or multiple OPUs. Traffic is interrupted. For example, the optical communication signals, including supervisory signals, within one or more optical fibers of the fiber optic cable segment may be impaired by a failure of components (e.g., amplifier, coupler, splice, optical pump unit, or the like at the respective repeaters 204, 206 and 208.

Alternatively, the optical communication signal failure may be due to damage to an optical fiber within one or more of the fiber optic cable segments 202, 222, 224 and 226. For example, a ship anchor or storm may cause damage (e.g., a slice or cut of the cable or a connection between a segment and repeater or other component) to a fiber optic cable segment 202 that impairs the ability of the optical fiber(s) within the fiber optic cable segment to carry a usable optical signal. In such a case, the impaired optical fiber may be an unusable optical path, which is an optical fiber that either carries an impaired optical signal (i.e., does not meet optical system specifications) or carries no optical signal at all (e.g., due to optical pump unit failure or damage to optical communication pathway).

As shown in FIG. 2A, when an unusable optical path is present in one fiber optic cable segment, such as fiber optic cable segment 202, the optical paths within the following fiber optic cable segments 222, 224 and 226 are also impacted whether or not any component within optical communication repeaters 204, 206, or 208. The example of FIG. 2B offers a solution to addressing the unusable optical path.

Figure 2B:
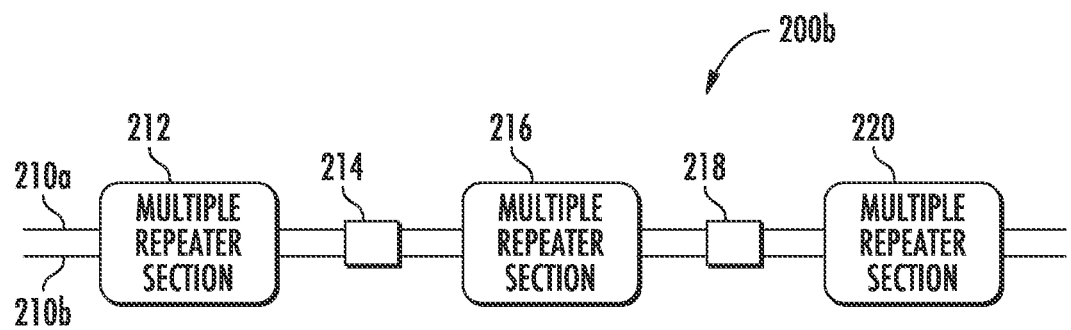
FIG. 2B illustrates an example of an optical communication pathway with a number of multiple repeater sections of FIG. 2A in combination with submarine optical communication recovery devices according to an embodiment.

FIG. 2B illustrates an example of an optical communication pathway with a number of multiple repeater sections of FIG. 2A in combination with submarine optical communication recovery devices according to an embodiment. In this example, the optical communication pathway 200b includes an East fiber optic cable segment 210a, a West fiber optic cable segment 210b, multiple repeater sections 212, 216 and 220, and submarine optical communication recovery devices 214 and 218.

The East fiber optic cable segment 210a may be operable to transmit optical signals from an optical signal source located in the East to an optical signal receiver in the West. Conversely, the West fiber optic cable segment 210b may be operable to transmit optical signals from an optical signal source located in the West to an optical signal receiver in the East. Fiber optic cable segments similar to 210a and 210b may be located between each multiple repeater section and each submarine optical communication recovery device. Each fiber optic cable segment, such as 210a and 210b and those between the respective multiple repeater sections and submarine optical communication recovery devices includes optical fibers over which may be transmitted optical signals. One of more of the optical fibers may be spare optical fibers that are not assigned to carry an optical communication signal or optical supervisory signals. Alternatively, the one or more spare optical fibers may be configured to carry redundant optical communication signals or optical supervisory signals, which in the case of a failure may be switched to carry the optical communication or optical supervisory signals affected by the failure. In an example, the East fiber optic cable segment 210a and West fiber optic cable segment 210b may be referred to as the segment that extends through all of the multiple repeater sections 212, 216 and 220 and the respective submarine optical communication recovery devices 214 and 218.

Each of the multiple repeater sections 212, 216 and 220 may include a number of repeaters, such as multiple repeater section 200a of FIG. 2A. Each repeater in the multiple repeater sections 212, 216 and 220 may be coupled to a fiber optic cable segment such as East fiber optic cable segment 210a and West fiber optic cable segment 210b. Each repeater may be operable to connect to individual optical fibers in each respective fiber optic cable segment.

In response to a failure of a repeater within at least one of the multiple repeater sections 212, 216 or 220, the submarine optical communication recovery devices 214 and 218 are operable to bypass the failed repeater. For example, an amplifier may have failed in one of the repeaters within the multiple repeater section 216 that amplifies optical communication signals in an optical fiber of the East fiber optic cable segment 210a. The submarine optical communication recovery device 218 may be operable to switch the optical fiber effected by the failed amplifier to a spare optical fiber within the East fiber optic cable segment 210a.

A more detailed discussion of the operation of a submarine optical communication recovery device and process is described in more detail with reference to the following examples.

Figure 3:
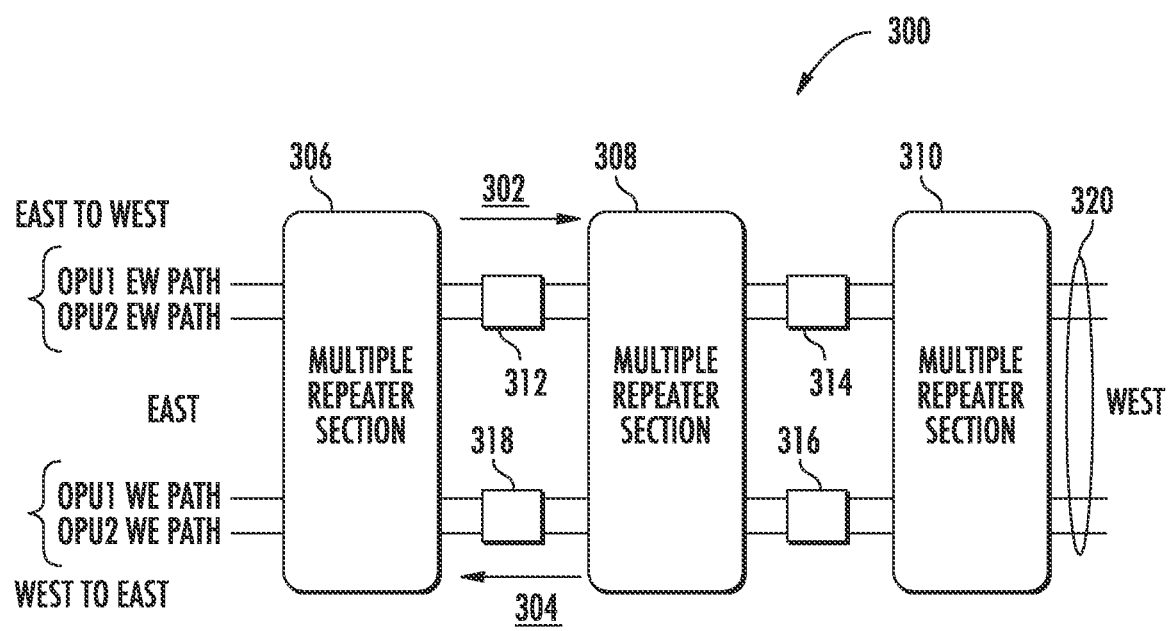
FIG. 3 illustrates a detailed example of an optical communication pathway in accordance with another embodiment.

FIG. 3 illustrates a detailed example of an optical communication pathway in accordance with another embodiment. The optical communication pathway 300 is similar to the optical communication pathway 200b of FIG. 2B with the exception of the expanded discussion of the submarine optical communication recovery devices. In the optical communication pathway 300, there may be a submarine fiber optic cable 320, multiple repeater sections 306, 308 and 310 as well as multiple submarine optical communication recovery devices 312, 314, 316 and 318.

The submarine fiber optic cable 320 may, for example, have four optical fibers, such as OPU1 EW Path, OPU2 EW Path, OPU1 WE path, and OPU1 WE path, and each optical fiber may carry optical communication and supervisory signals. For example, the optical fibers OPU1 EW Path, OPU2 EW Path may carry optical communication and supervisory signals from a transmitter (not shown) in the East to a receiver (not shown) in the West in the East to West direction indicated by arrow 302. The optical fibers OPU1 WE Path, OPU2 WE Path may carry optical communication and supervisory signals from a transmitter (not shown) in the West to a receiver (not shown) in the East in the West to East direction indicated by arrow 304. The submarine fiber optic cable may include a number of other optical fibers (not shown in this example) operable to carry optical communication signals and/or supervisory signals output by the respective transmitters but, for ease of illustration and discussion, only the optical fibers OPU1 EW Path, OPU2 EW Path, OPU1 WE path, and OPU1 WE path are presented.

Each multiple repeater section 306, 308 and 310 may arranged in a similar manner. For example, the multiple repeater section 306 may include a number of repeaters as shown in the example of FIG. 2A. Each repeater may include an amplifier for each optical fiber as well as one or more optical pump units that include lasers as shown in earlier examples.

The submarine optical communication recovery devices 312, 314, 316 and 318 may be spaced between multiple repeater sections 306, 308 and 310. Each of the respective submarine optical communication recovery devices may be configured to bypass an unusable optical path output from one of the repeaters in a respective multiple repeater section.

In an operational example, an amplifier coupled to an optical fiber may fail in a one of the repeaters in the multiple repeater section 308. The amplifier may be coupled to the optical fiber in the OPU1 WE path of submarine fiber optic cable 320. As a result of the amplifier failure, an optical communication signal failure may occur resulting in an optical fiber coupled to the amplifier in the OPU1 WE path becoming impaired or unusable. The submarine optical communication recovery device 316 may be operable to switch an input that supplies optical signals to the optical fiber experiencing the optical communication signal failure to another optical fiber that is unaffected by the amplifier failure. In conjunction with the switching performed by the submarine optical communication recovery device 316, the submarine optical communication recovery device 318 may be operable to switch the unusable optical path (not shown in this example) output from the multiple repeater section 308 to an impaired output (not shown in this example), which is a predetermined output that is held in reserve for such occasions.

An example configuration and operation of a submarine optical communication recovery device is described with reference to FIG. 4.

Figure 4:
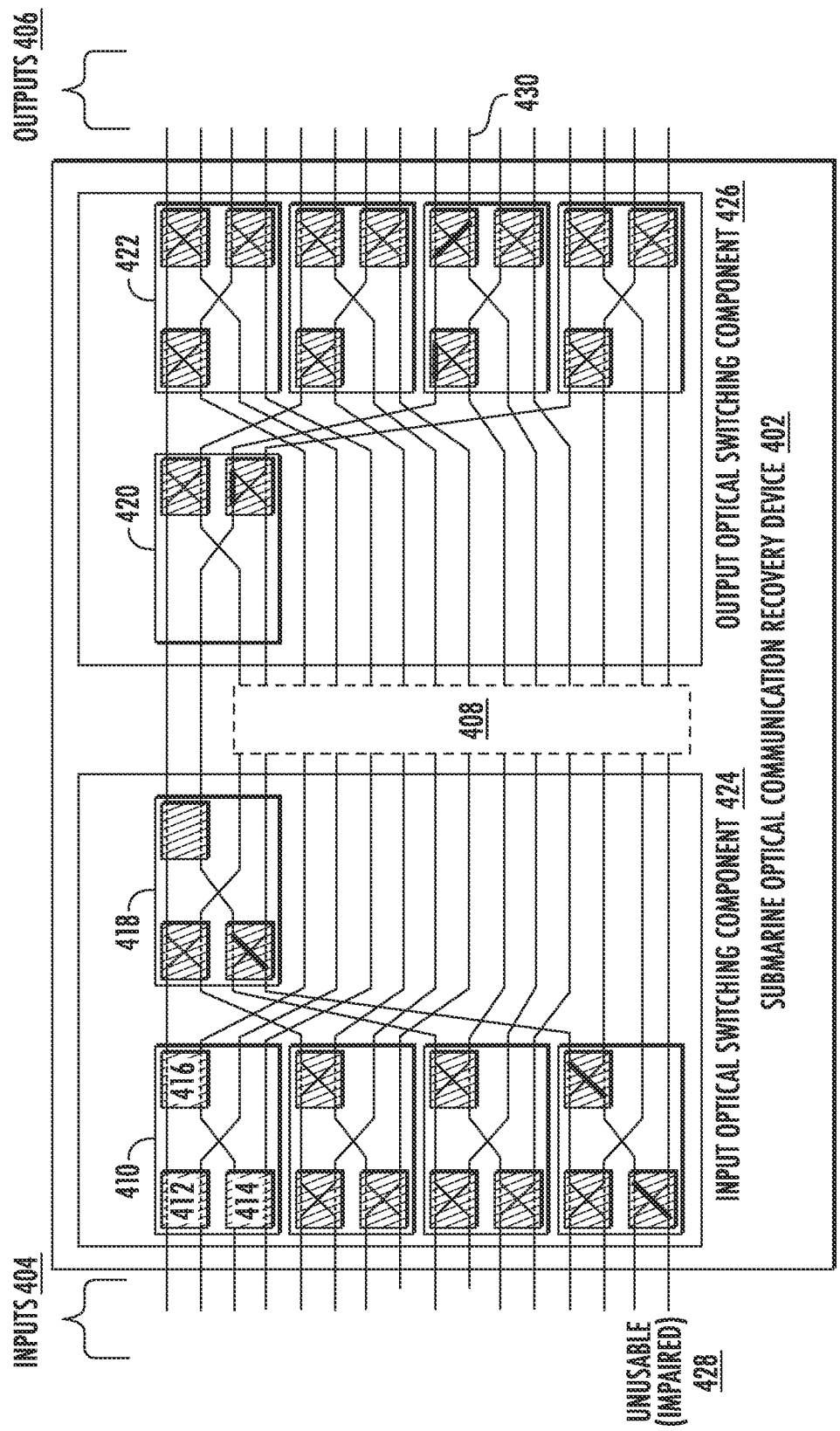
FIG. 4 illustrates an example of a submarine optical communication recovery device.

FIG. 4 illustrates a more detailed example of a submarine optical communication recovery device. The submarine optical communication recovery device 402 may be configured to be positioned in an optical communication pathway between a pair of optical signal repeaters as discussed with reference to other examples. The submarine optical communication recovery device 402 includes inputs 404, outputs 406 and a number of optical switch modules 410, 418, 420 and 422. In some examples, the submarine optical communication recovery device 402 may also include an optical switch loss compensator 408.

Each of the optical switch modules 410, 418, 420 and 422 includes a number of optical switches, such as optical switches 412, 414 and 416. Each optical switch is operable to switch an optical signal, such as an optical communication signal or optical supervisory signal. For example, optical switch module 410 includes optical switches 412, 414 and 416 which are 2 by 2 switches (i.e., 2 inputs and 2 outputs). Other optical switches having different numbers of inputs and/or outputs may also be used.

In one aspect, a submarine optical communication recovery device 402 may include a number of inputs 404 and a number of outputs 406. Each input of the number of inputs 404 is operable to connect to a respective optical fiber of a number of optical fibers in a submarine fiber optic cable (not shown in this example) or in a fiber optic cable segment to any one output of the number of outputs 406.

A portion of the number of optical fibers of the submarine fiber optic cable carry optical signals and at least one optical fiber of the plurality of optical fibers is an unusable optical path that is unable to carry an optical signal. The term "Unusable optical path" may refer to an optical fiber that either carries an impaired optical signal (e.g., does not meet optical signal specifications for the optical communication system) or carries no optical signal at all (e.g., a portion of the optical fiber is severed or a component failure at a repeater prevents all signals from passing). The submarine optical communication recovery device 402 may have spare inputs and spare outputs that are designated for coupling to the unusable optical paths (examples are described with reference to later examples).

Each output of the number of outputs 406 couples to another respective optical fiber of another submarine fiber optic cable (to continue the transmission), and a predetermined number (e.g., 1-5) of the total number of outputs (e.g., 16-64) are designated as impaired outputs (e.g, 430). The submarine optical communication recovery device 402 also includes a plurality of optical switch modules (such as 410, 418, 420 and 422) operable to connect an input of the plurality of inputs 404 coupled to the unusable optical path (i.e., unusable (impaired) 428) to an output of the number of the impaired outputs 406 that is designated as an impaired output 430.

In an example, each respective optical switch module (e.g., 410, 418, 420 or 422) of the plurality of optical switch modules of the submarine optical communication recovery device 402 may include a predetermined number of optical switches (e.g., 412, 414, 416). In the FIG. 4 example, input optical switching component 424 includes five optical switch modules that each include three optical switches. Each optical switch module is 4 input by 4 output modules and the optical switches are each 2 input by 2 output optical switches that enable any of the four inputs to a respective predetermined output.

The submarine optical communication recovery device 402 has a mirrored pair of optical switching components. In the example, the submarine optical communication recovery device 402 may include a first portion of the number of optical switching modules that are arranged as an input optical switching component 424 and a second portion of the number of optical switching modules that are arranged as an output optical switching component 426. Each of the input optical switching component 424 and the output optical switching component 426 may include an equal number of optical switching modules. The equal number of optical switching modules enables the submarine optical communication recovery device 402 to have an equal number of inputs 404 and outputs 406. In a specific example, the number of optical switches may be predetermined. For example, the predetermined number of optical switches may be three optical switches, and each of the three optical switches, such as 412, 414 and 416, may include two inputs and two outputs. The mirrored pair of optical switching components 424 and 426 enables the submarine optical communication recovery device 402 to reduce the number of switches (as compared to the example of FIG. 1A) needed to provide appropriate redundancy.

In addition, each respective optical switch module of the submarine optical communication recovery device 402 may have a designated output that is designated to be couple to a pathway to an impaired output of the submarine optical communication recovery device 402, so each respective optical switch module is operable to couple an input to its respective designated output. The submarine optical communication recovery device 402 is operable to couple the unusable (impaired) input 428 to the one impaired output 430. The one impaired output 430 may be one of the number of impaired outputs.

In a further example, the optical switch loss compensator 408 of the submarine optical communication recovery device 402 may be configured to account for the signal loss as the optical signal passes through the submarine optical communication recovery device 402. For example, all of the optical switches in the submarine optical communication recovery device 402 including optical switches 412, 414 and 416 introduce a signal loss to an optical signal that passes through the respective optical switch. For example, each of optical switches 412, 414 and 416 may individually introduce a loss of approximately 0.3 dB, but in the aggregate introduce a loss of 0.6 dB for an optical switch module. As a result, optical communication signals that pass through multiple optical switch modules may have a significant loss. The optical switch loss compensator 408 may be configured to compensate for a maximum loss of any one input to the submarine optical communication recovery device 402. For example, optical signals that are directed to optical switch module 418 and optical switch module 420 may experience the maximum signal loss of any optical signal passing through the submarine optical communication recovery device 402. Hence, the optical switch loss compensator 408 may be operable to equalize the signal loss of all the other inputs to the maximum signal loss. The optical switch module 420 may be different from all of the other optical switch modules of the submarine optical communication recovery device 402 in that may use less than the three optical switches used in the other optical switch modules, such as 410, 418 or 422. The optical switch loss compensator 408 is also operable to compensate for the signal loss in the output optical switching component 426. The optical switch loss compensator 408 may have different devices, such as optical attenuator (LBO) devices, that incorporate optical loss into the optical communication path.

In this implementation, due to the fact that optical switch module 420 utilizes two optical switches, the submarine optical communication recovery device 402 may use a total of 29 optical switches. All optical fibers that are usable (i.e., have optical signals meeting system specifications) may be connected to inputs of and outputs from the submarine optical communication recovery device 402.

The submarine optical communication recovery device 402 may include a processor or hardware/software device, such as an application-specific integrated chip (ASIC) or firmware device, that is operable to control the switching logic of each respective optical switch module to provide the coupling of the unusable optical path at an input to a designated output (i.e., designated as an impaired output). The processor or hardware/software device may be operable to respond to supervisory signals or to monitor optical signal traffic and respond to a change in traffic (e.g., loss of optical signal power or loss of signal altogether or the like) by performing recovery operations. In addition, downstream connections and switching may be to be reconfigured to account for the recovery provided by the optical switch arrangement.

Figure 5:
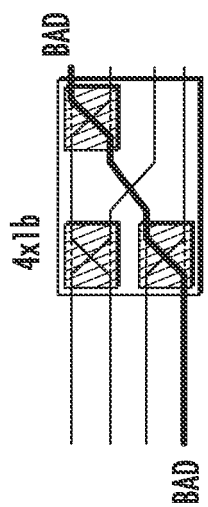
FIG. 5 illustrates examples of optical switches usable with different embodiments as described herein.
Figure 5:
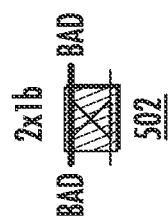
Figure 5:
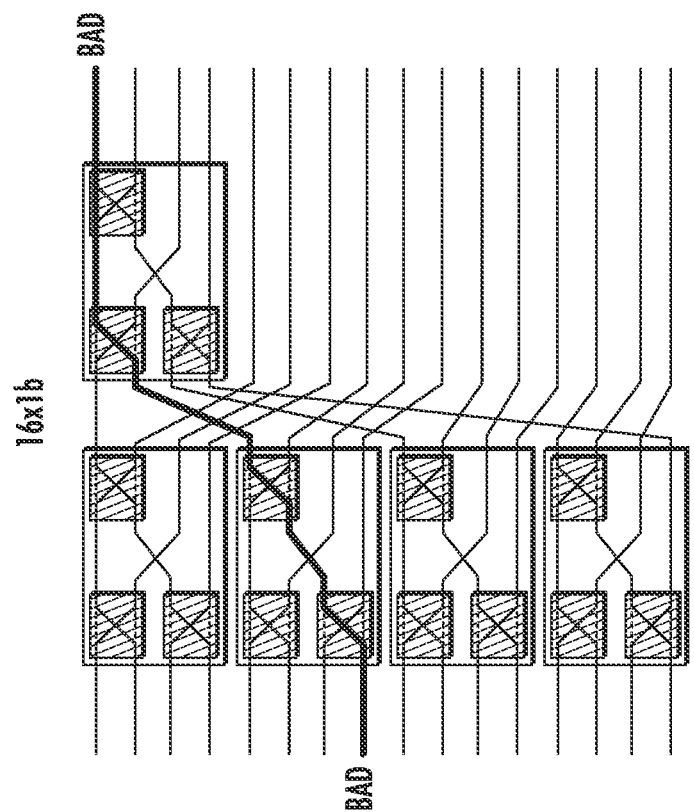
Figure 5:
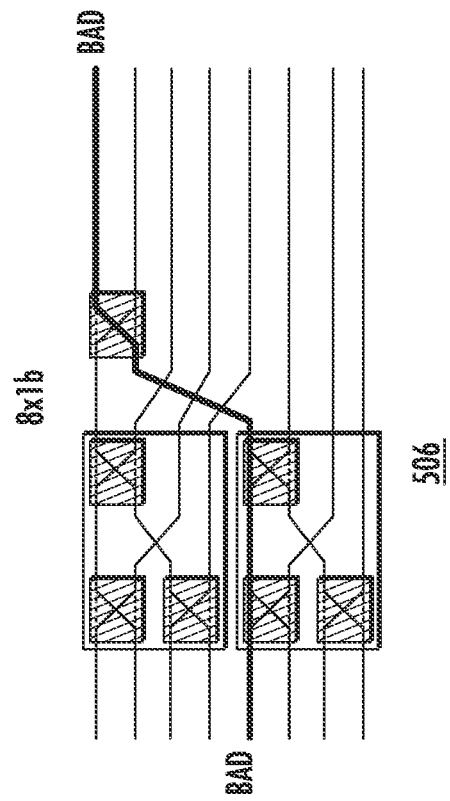

FIG. 5 illustrates examples of optical switches usable with different embodiments as described herein. Each of the optical switch module 504-508 are operable to direct the unusable optical path to a predetermined switch output regardless of which input the unusable optical path is connected.

Optical switch 502 may also be referred to as an optical switch module in which the number of inputs is two and the number of "bad" outputs is one (i.e., 1b). A "bad" output is an output at which the unusable optical path is connected. In the optical switch 502 example, the unusable optical path is a "bad" input that through switching logic and control is directed to the top output (or first output) that may be an output designated as the "bad output (i.e., the output that is reserved or predetermined to be the "bad" output). Different configurations of optical switch modules may be provided by utilizing multiple optical switches, such as optical switch 502.

In the example, the optical switch module 504 has four optical signal inputs that couple to four optical fibers of a submarine fiber optic cable in which one of the four optical fibers is an unusable optical path (i.e., Bad) and has four optical signal outputs. One of the four optical signal outputs, such as the top or first output of optical switch module 504 may be designated to be the "bad" output. In an example, the optical switch module 504 may include a number of optical switches, such as optical switch 502, and may be operable to couple, for example, the unusable optical path at the bottom or fourth input of the four inputs to a top or a first output by switching the respective switches of the number of optical switches in the optical switch module to complete the connection. The designation of the top or first output to connect to the "bad" input may be done at an initial optical switch module design or may be adjusted based on control software, remote commands, or the like.

In a further example, the optical switch module 506 has 8 optical signal inputs that couple to 8 optical fibers of a submarine fiber optic cable in which one of the 8 optical fibers is an unusable optical path (i.e., Bad) and has 8 optical signal outputs. The optical switch module 506 may accommodate up to 8 inputs (one of which that may be determined to be a "bad" input) and 8 outputs with the one bad input at a predetermined output. The optical switch module 506 may be referred to as an 8 by 1b, where 8 is the number of inputs and the 1b is the number of "bad" outputs. The optical switch module 506 may include a number of optical switches, such as optical switch 502, and may be operable to configure the number of optical switches, of the optical switch module 506 to connect a "bad" input at, for example, input number 5 of the 8 inputs to the top or first output that may be designated or predetermined to connect to the "bad" input. The designation of the top or first output to connect to the "bad" input may be done at an initial optical switch module design or may be adjusted based on control software, remote commands, or the like.

In yet a more expansive example, the optical switch module 508 has 16 optical signal inputs that couple to 16 optical fibers of a submarine fiber optic cable in which one of the 16 optical fibers is an unusable optical path (i.e., Bad) and has 16 optical signal outputs. The optical switch module 508 may accommodate up to 16 inputs (one of which that may be determined to be a "bad" input) and 16 outputs with the one bad input at a predetermined output. The optical switch module 508 may be referred to as a 16 by 1b, where 16 is the number of inputs and the 1b is the number of "bad" outputs. The optical switch module 508 may include a number of optical switches, such as optical switch 502, and may be operable to configure the number of optical switches, such as optical switch 502, of the optical switch module 508 to connect a "bad" input at input number 8 of the 16 inputs to the top or first output that may be designated or predetermined to connect to the "bad" input. The designation of the top or first output to connect to the "bad" input may be done at an initial optical switch module set up or may be adjusted based on control software, remote commands, or the like.

The example optical switch modules in this example illustrate an example of an input optical switching component, such as 424 of FIG. 4. The top output of each of the optical switch modules in this example is expected to pass to an input of an output optical switching component, such as 426 of FIG. 4. The output component, such as component 426, can be a mirror image of the input component, such as 424, thus enabling connection of a single input at any location at the input side, to any of the output.

It may be helpful to consider an optical communication recovery system having a submarine optical communication recovery device.

Figure 6:
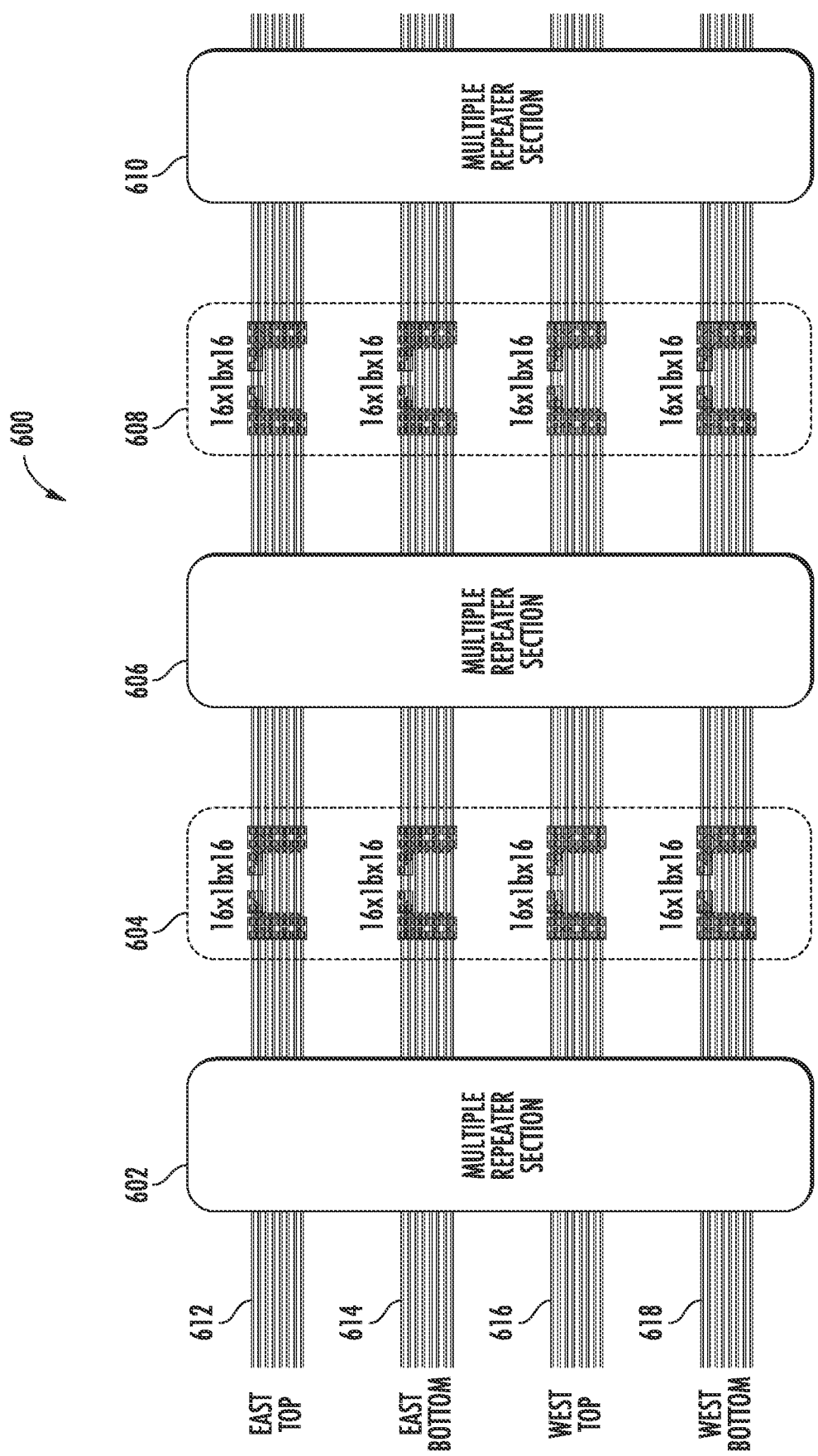
FIG. 6 illustrates an example of an optical communication recovery system in accordance with an embodiment.

FIG. 6 illustrates an example of an optical communication recovery system in accordance with an embodiment. The optical communication recovery system 600 may include multiple repeater sections 602, 606 and 610, a first submarine optical communication recovery device 604, a second submarine optical communication recovery device 608, a top part of a first optical fiber cable 612 (East top), a bottom part of the first optical fiber cable 614 (East bottom), a top part of a second optical fiber cable 616 (West top), a bottom part of an optical fiber cable 618 (West bottom).

In this example, an optical pump unit (not shown), but such as optical pump unit 100b of FIG. 1B, may be operable to provide inputs to an optical communication pathway that has a West top fiber optic cable segment, a West bottom fiber optic cable segment, an East top fiber optic cable segment and an East bottom fiber optic cable segment.

The East direction cable may include optical fiber cable 612 (East top) and optical fiber cable 614 (East bottom), which may be accommodated by a single 32×2b×32 optical switch module or by a pair of 16×1b×16 optical switch modules. The overhead is 2/30 or 7%, where the number of "bad" optical fibers that may be accommodated is 2 and the number of optical fibers that are still operable (i.e., transmitting optical signals that meet the optical communication specifications of the optical communication system) is 30 out of a 32 fiber pair (FP) cable. In an example, in which 2×4 (2 laser pumps and 4 outputs) or 4×4 (4 laser pumps and 4 outputs) optical pump units (OPU) are utilized, effective 30 FP system, contains 16 OPUs. In some examples, if semiconductor optical amplifiers (SOAs) are used or if there is no need for OPU failure protection (e.g., OPUs are not needed with, for example, Erbium-doped fiber amplifiers (EDFA) or when the OPU has a higher reliability than other repeater components), then a 32×1b×32 optical switch module can be used instead. The system then becomes 31 FP system or 3% overhead instead of 7%. In this example, the optical communication recovery system 600 is operable to survive 1 to 4 failures in each multiple repeater section or single OPU failure per multiple repeater section.

In a likely implementation, each multiple repeater section 604 or 608 may include 4 OPUs for each direction portion (i.e., East Top has 4 OPUs, East Bottom has 4 OPUs, West Top has 4 OPUs and West Bottom has 4 OPUs) and a failure of an OPU may lead to a "bad" optical fiber in each of the respective direction (i.e., a "bad" optical fiber in the East Top, a "bad" optical fiber in the East Bottom, a "bad" optical fiber in the West Top, and a "bad" optical fiber in the West Bottom).

The submarine optical communication recovery devices 604 and 608 may include a processor or hardware/software device, such as an application-specific integrated chip (ASIC) or firmware device, that is operable to control the switching logic of each respective optical switch module to provide the coupling of the unusable optical path at an input to a designated output (i.e., designated as an impaired output). The processor or hardware/software device may be operable to respond to supervisory signals or to monitor optical signal traffic and respond to a change in traffic (e.g., loss of optical signal power or loss of signal altogether or the like) by performing recovery operations. In addition, downstream connections and switching may be to be reconfigured to account for the recovery provided by the optical switch arrangement. Downstream connections and switching may be reconfigured to account for the recovery provided by the optical switch arrangement. For example, submarine optical communication recovery device 608 may have a first switching arrangement in response to an unusable optical path in multiple repeater section 606 (e.g., due to an optical communication signal failure) that enables the optical communication signals to bypass the multiple repeater section 606. In order to maintain the delivery of the optical communication signals, the optical switch modules of submarine optical communication recovery device 604 may be reconfigured to enable continued transmission of the optical communication signals from a transmitter to an intended receiver.

An advantage of the presented examples is a reduced part count that reduces the amount of optical switch overhead. For example, the optical communication recovery system 600 utilizes one-hundred and sixteen optical switches to serve 64 fibers. In contrast, if an implementation such as that presented in FIG. 1A were to be implemented, 128 optical switches (2 for each fiber) would be used. Hence, the example submarine optical communication recovery devices enable more reliable optical communication systems due to the reduced number of parts and a capability to address unusable optical paths.

Figure 7:
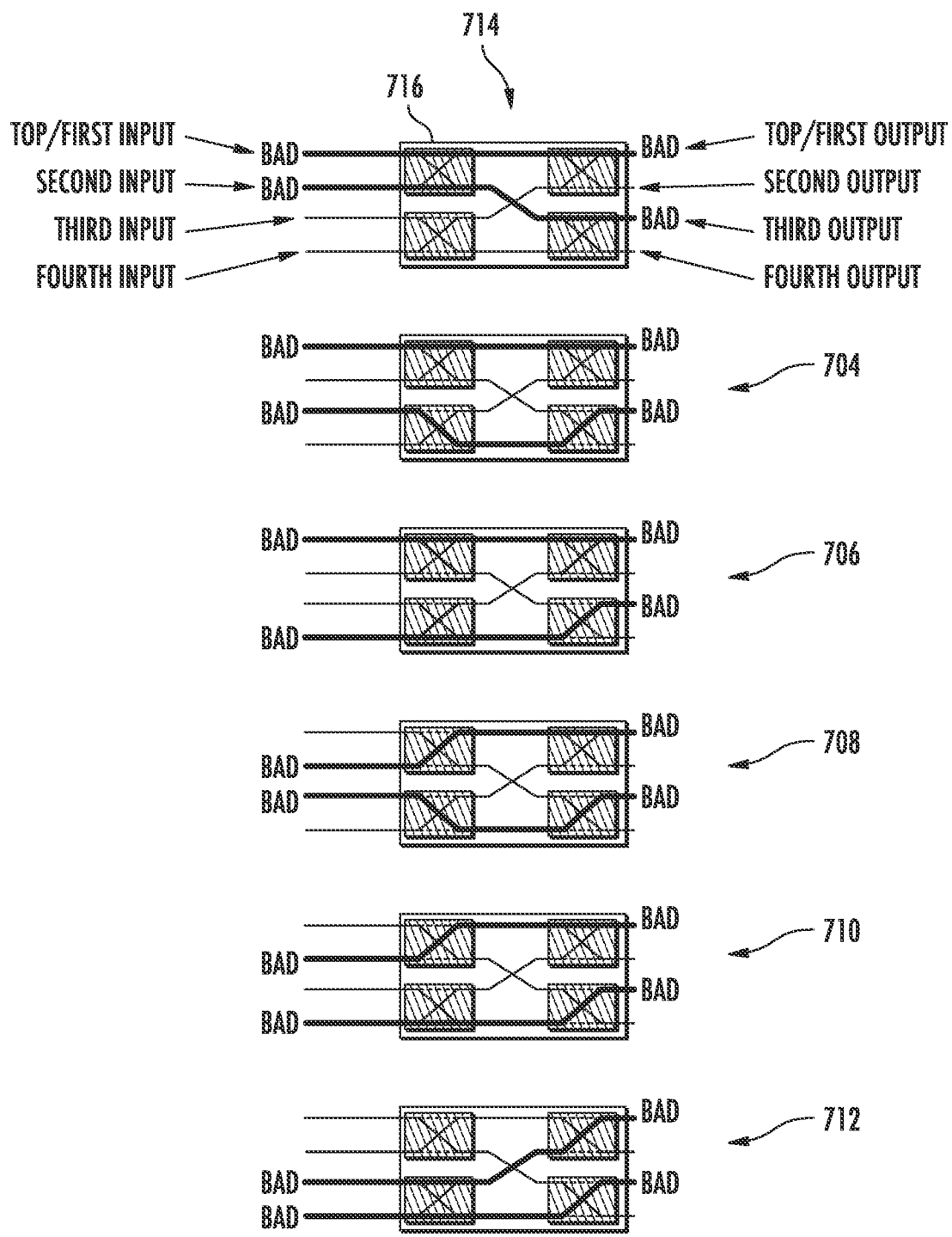
FIG. 7 illustrates an example of different states of an optical switching module when recovering from two unusable optical paths aspect of the subject matter in accordance with an embodiment.

FIG. 7 illustrates an example of different states of an optical switching module when recovering from two unusable optical paths aspect of the subject matter in accordance with an embodiment. This example illustrates an optical switching arrangement that improves redundancy while reducing a number of component parts.

The 2-unusable switching module 714 is an optical switching module that includes multiple optical switches 716. In this example, each optical switch 716 has two switches and there are four optical switches 716 in each 2-unusable fiber optic switching module 714. Each 2-unusable fiber optic switching module 714 is operable to receive two unusable optical paths (identified as "bad"). As mentioned with respect to an earlier example, an unusable optical path is an optical fiber that either carries an impaired optical signal (e.g., does not meet optical signal specifications for the optical communication system) or carries no optical signal at all (e.g., a portion of the optical fiber is severed or a component failure at a repeater prevents all signals from passing).

In 2-unusable I/O switch state 702, the two unusable (i.e., "bad") inputs are the top or first input and the second input to the 2-unusable fiber optic switching module 714. Each 2-unusable fiber optic switching module 714 has four inputs—top/first input, second input, third input, fourth input—and four outputs—top/first output, second output, third output, fourth output. In the example switching module, the 2-unusable fiber optic switching module 714 has two outputs that are designated for output of the "bad" or impaired fiber optic (labeled as "Bad"). The two designated outputs correspond to a top output of the respective optical switch 716, or the top/first output and the third output of the 2-unusable fiber optic switching module 714.

In FIG. 7, the 2-unusable I/O switch state 702 indicates that the "bad" optical fibers are coupled to the top/first input and the second input and the switches are output to the top/first output and the third output of the 2-unusable fiber optic switching module 714, which in this example are the designated outputs.

The 2-unusable I/O switch state 704 indicates that the "bad" optical fibers are coupled to the top/first input and the third input and are output to the top/first output and the third output of the 2-unusable fiber optic switching module 714, which in this example are the designated outputs.

The 2-unusable I/O switch state 706 indicates that the "bad" optical fibers are coupled to the top/first input and the fourth input and are output to the top/first output and the third output of the 2-unusable fiber optic switching module 714, which in this example are the designated outputs.

The 2-unusable I/O switch state 708 indicates that the "bad" optical fibers are coupled to the second input and the third input and are output to the top/first output and the third output of the 2-unusable fiber optic switching module 714, which in this example are the designated outputs.

The 2-unusable I/O switch state 710 indicates that the "bad" optical fibers are coupled to the second input and the fourth input and are output to the top/first output and the third output of the 2-unusable fiber optic switching module 714, which in this example are the designated outputs.

The 2-unusable I/O switch state 712 indicates that the "bad" optical fibers are coupled to the third input and the fourth input and are output to the top/first output and the third output of the 2-unusable fiber optic switching module 714, which in this example are the designated outputs.

Using these 6 different states, a submarine optical communication recovery device may be operable to recover from an optical communication signal failure that affects two optical fibers. Such an optical recovery device is illustrated in another example.

Figure 8:
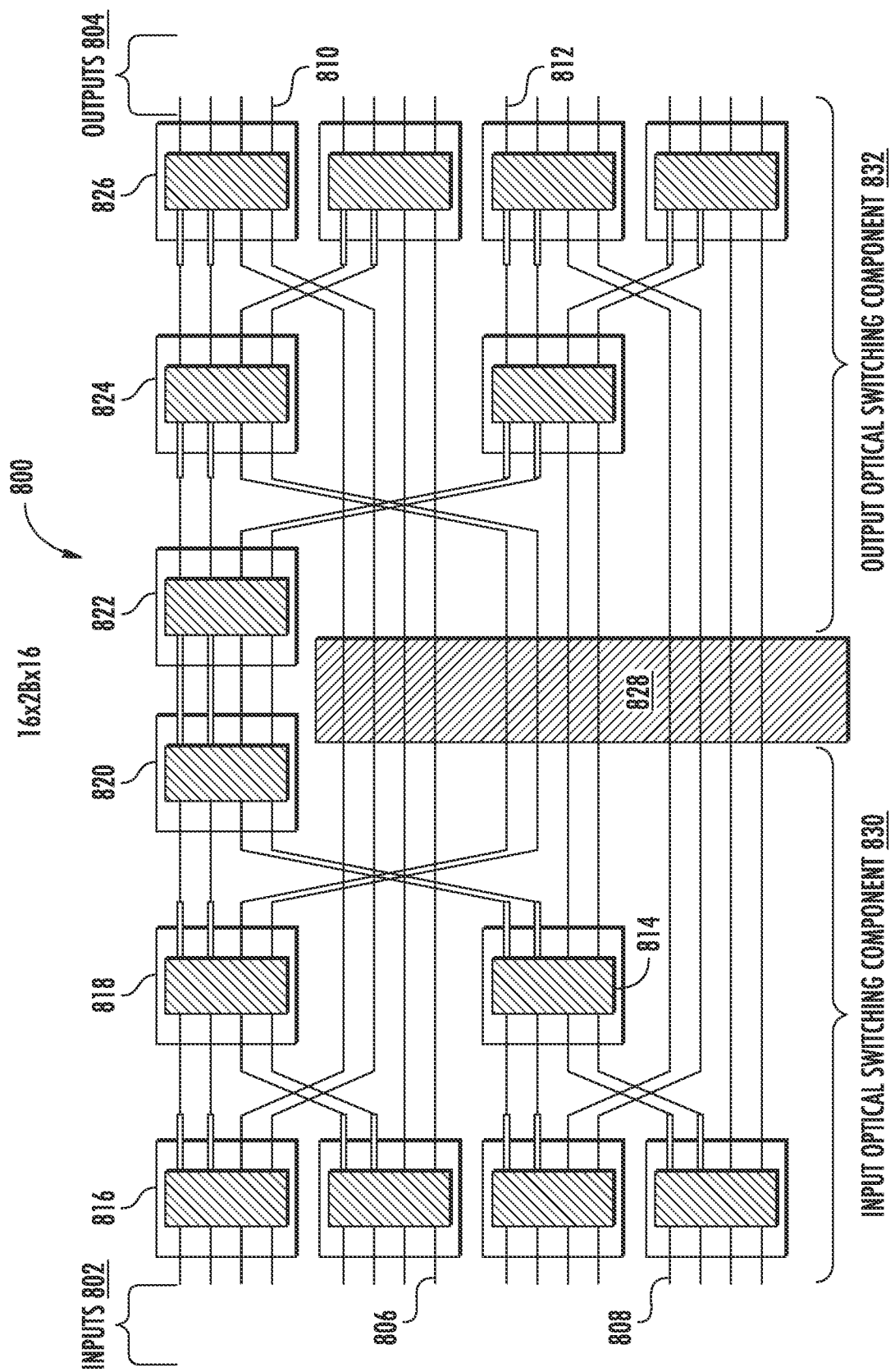
FIG. 8 illustrates another example of a submarine optical communication recovery device.

FIG. 8 illustrates another example of a submarine optical communication recovery device. The submarine optical communication recovery device 800. The submarine optical communication recovery device 800 may be configured to be positioned in an optical communication pathway between a pair of optical signal repeaters as discussed with reference to other examples. The submarine optical communication recovery device 800 includes inputs 802, outputs 804 and a number of optical switch modules 816, 818, 820, 822, 824, and 826. In some examples, the submarine optical communication recovery device 402 may also include an optical switch loss compensator 828.

Each of the optical switch modules 816, 818, 820, 822, 824, and 826 may include a number of optical switches (such as optical switch 716 of FIG. 7). The number of optical switches may be four as in 2-unusable fiber optic switching module 714 of FIG. 4. Each optical switch is operable to switch an optical signal, such as an optical communication signal or optical supervisory signal. For example, optical switch module 816 may include four optical switches, each of which are 2 by 2 switches (i.e., 2 inputs and 2 outputs). Of course, other optical switches having different numbers of inputs and/or outputs may also be used to provide a similar configuration.

In one aspect, a submarine optical communication recovery device 800 may include the number of inputs 802 and the number of outputs 804. Each input of the number of inputs 802 is operable to connect to a respective optical fiber of a number of optical fibers in a submarine fiber optic cable (not shown in this example) or in a fiber optic cable segment to any one output of the number of outputs 804.

A portion of the number of optical fibers of the submarine fiber optic cable carry optical signals and at least one optical fiber of the plurality of optical fibers is an unusable optical path that is unable to carry an optical signal. The term "Unusable optical path" may refer to an optical fiber that either carries an impaired optical signal (e.g., does not meet optical signal specifications for the optical communication system) or carries no optical signal at all (e.g., a portion of the optical fiber is severed or a component failure at a repeater prevents all signals from passing). The submarine optical communication recovery device 402 may have spare inputs and spare outputs that are designated for coupling to the unusable optical paths (examples are described with reference to later examples).

Each output of the number of outputs 804 may couple to another respective optical fiber of another submarine fiber optic cable (to continue the transmission), and a predetermined number (e.g., 1-5) of the total number of outputs (e.g., 16-64) are designated as impaired outputs (e.g, impaired 810 and impaired 812). The submarine optical communication recovery device 402 also includes the optical switch modules (such as 816, 818, 820, 822, 824 and 826) that may be operable to connect each input of the number of inputs 802 coupled to the unusable optical path, such as inputs 806 and 808, to an output of the number of the impaired outputs 804 that is designated as an impaired output, such as 810 and 812.

In an example, each respective optical switch module (e.g., 816, 818, 820, 822, 824 or 826) of the plurality of optical switch modules of the submarine optical communication recovery device 800 may include a predetermined number of optical switches (not shown in this example).

The submarine optical communication recovery device 800 may have a mirrored pair of optical switching components. In the example, the submarine optical communication recovery device 800 may include a first portion of the number of optical switching modules that are arranged as an input optical switching component 830 and a second portion of the number of optical switching modules that are arranged as an output optical switching component 832. Each of the input optical switching component 830 and the output optical switching component 832 may include an equal number of optical switching modules. For example, the input optical switching component 830 may include optical switch modules 816, 818, 820 and at least four other optical switch modules and output optical switching component 832 may include optical switch modules 822, 824, 826 and at least four other optical switch modules as shown in FIG. 8. The equal number of optical switching modules enables the submarine optical communication recovery device 800 to have an equal number of inputs 802 and outputs 804.

In addition, each respective optical switch module of the submarine optical communication recovery device 800 may have a number of designated outputs, such as 810 and 812, that are designated to be couple to a pathway to an impaired output of the submarine optical communication recovery device 800, so each respective optical switch module is operable to couple an input to its respective designated output. The submarine optical communication recovery device 800 may be operable to couple one or both of the unusable (impaired) inputs 806 and 808 to a respective impaired output 810 or 812.

In a further example, the optical switch loss compensator 828 of the submarine optical communication recovery device 800 may be configured to account for the signal loss as the optical signal passes through the submarine optical communication recovery device 800. For example, all of the optical switch modules in the submarine optical communication recovery device 800 may introduce a signal loss to an optical signal that passes through the respective optical switch. The optical switch loss compensator 828 may be configured to compensate for a maximum loss of any one input to the submarine optical communication recovery device 800. For example, optical signals that are directed to optical switch module 820 and optical switch module 822 may experience the maximum signal loss of any optical signal passing through the submarine optical communication recovery device 800. Hence, the optical switch loss compensator 828 may be operable to equalize the signal loss of all the other inputs to the maximum signal loss. The optical switch loss compensator 828 may have different devices, such as lithium triborate devices, that incorporate optical loss into the optical communication path.

In this implementation, the submarine optical communication recovery device 800 may use a total of 56 optical switches. All optical fibers that are usable (i.e., have optical signals meeting system specifications) are connected to inputs 802 and outputs 806 from the submarine optical communication recovery device 800.

Figure 9:
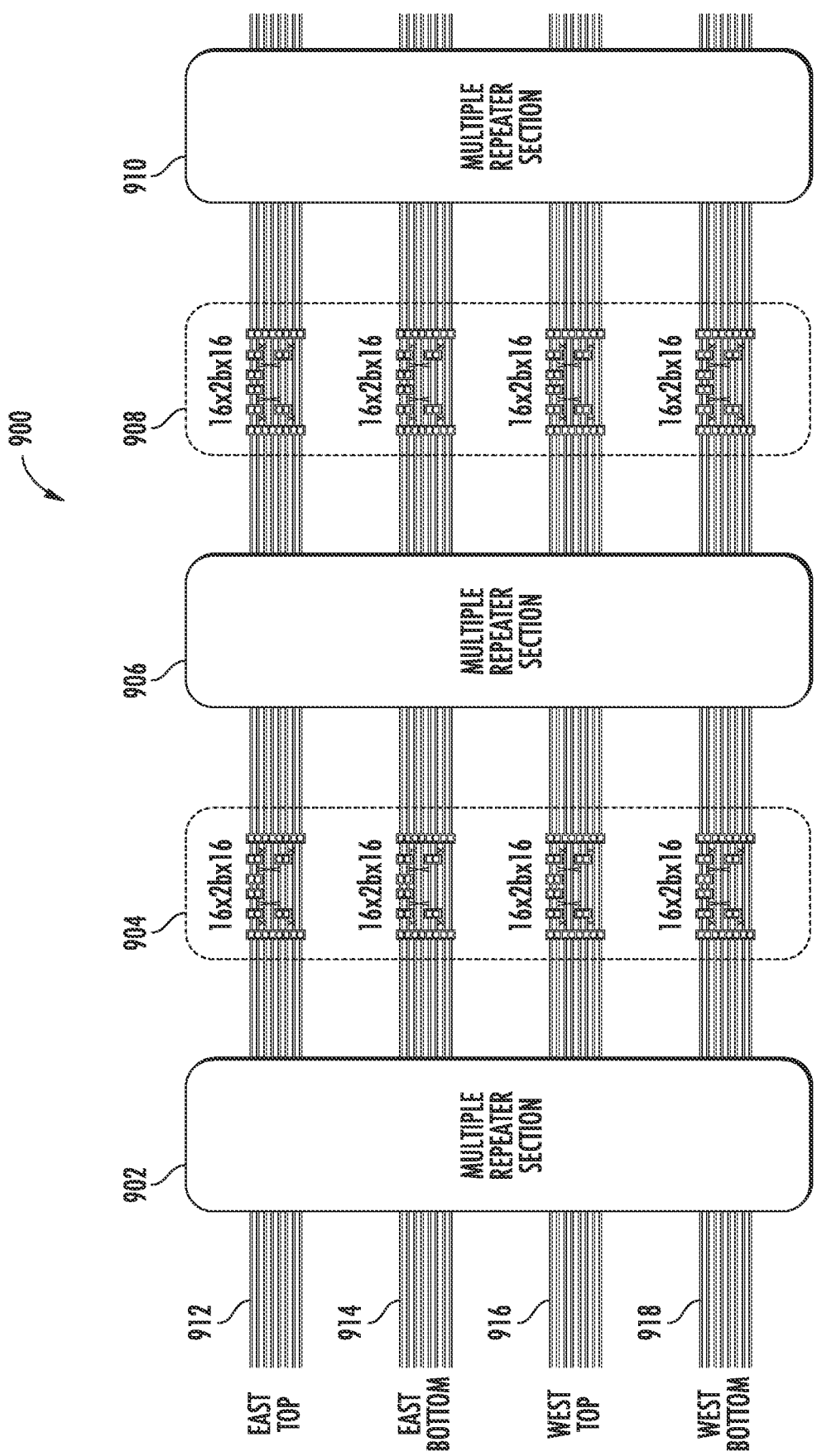
FIG. 9 illustrates an example of another optical communication recovery system in accordance with an embodiment.

FIG. 9 illustrates an example of another optical communication recovery system in accordance with an embodiment.

The optical communication recovery system 900 may include multiple repeater sections 902, 906 and 910, a first submarine optical communication recovery device 904, a second submarine optical communication recovery device 908, a top part of a first optical fiber cable 912 (East top), a bottom part of the first optical fiber cable 914 (East bottom), a top part of a second optical fiber cable 916 (West top), a bottom part of an optical fiber cable 918 (West bottom).

In this example, an optical pump unit (not shown), but such as optical pump unit 100*b* of FIG. 1B, may be operable to provide inputs to an optical communication pathway that has a West top fiber optic cable segment, a West bottom fiber optic cable segment, an East top fiber optic cable segment and an East bottom fiber optic cable segment.

With 2×4 or 4×4 pumps, the system when operable to recover from 4 unusable optical paths has effectively 28 FP (e.g., 4 bad paths/28 good paths that equates to a 14% overhead). In the example, the optical communication recovery system 900 may utilize 16 OPUs. Note, if SOAs are used or if there is no need for OPU failure protection, then 32×2b×32 can be used instead. The optical communication recovery system 900, then becomes a 30 FP system (with a 7% overhead). In the FIG. 9 example, the optical communication recovery system ~~600~~ 900 may be operable to survive 2 to 8 failures in each multiple repeater section or two OPU failures per multiple repeater section. A failure that occurs in the same optical fiber or optical communication pathway between repeaters in a multiple repeater section may be considered a single failure. The overhead is 2 bad optical fibers/30 good optical fibers or 7%.

The submarine optical communication recovery devices 904 and 908 may include a processor or hardware/software device, such as an application-specific integrated chip (ASIC) or firmware device, that is operable to control the switching logic of each respective optical switch module to provide the coupling of the unusable optical path at an input to a designated output (i.e., designated as an impaired output). The processor or hardware/software device may be operable to respond to supervisory signals or to monitor optical signal traffic and respond to a change in traffic (e.g., loss of optical signal power or loss of signal altogether or the like) by performing recovery operations. In addition, downstream connections and switching may be to be reconfigured to account for the recovery provided by the optical switch arrangement. Downstream connections and switching may be reconfigured to account for the recovery provided by the optical switch arrangement. For example, submarine optical communication recovery device 908 may have a first switching arrangement in response to an unusable optical path in multiple repeater section 906 (e.g., due to an optical communication signal failure) that enables the optical communication signals to bypass the multiple repeater section 906. In order to maintain the delivery of the optical communication signals, the optical switch modules of submarine optical communication recovery device 904 may be reconfigured to enable continued transmission of the optical communication signals from a transmitter to an intended receiver.

An advantage of the presented examples is a reduced part count that reduces the amount of optical switch overhead. For example, the optical communication recovery system 900 utilizes 224 optical switches (e.g., 56 times 4) to serve 64 fibers but with the capability to accommodate 2 unusable optical paths. In contrast, if an implementation such as that presented in FIG. 1A were to be implemented, 128 optical switches (2 for each fiber) would be required for a single amplifier redundancy in each optical fiber (as shown in FIG. 1A). Hence, the example submarine optical communication recovery devices 904 and 908 enable more reliable optical communication systems due to the reduced number of parts and a capability to address unusable optical paths.

FIG. 10A illustrates a table for determining a number of optical switches based on a number of inputs according to an embodiment.

The solutions to optical communication recovery presented above do not lead to doubling of the number of amplifiers (i.e., 100% amplifier overhead due to a redundant amplifier), but may be performed by utilizing fewer switches, which reduces a percentage of amplifier overhead.

In the table 1000*a*, the Y coefficient may correspond to the number of inputs and the number of outputs to the submarine optical communication recovery device that accounts for one unusable optical path. Based on the value of Y, the number (#) of switches may be determined. For example, if there are 16 inputs as in the example of FIG. 4, the number of switches used to provide a redundant path to bypass the unusable optical path and provide a usable optical fiber to transmit optical communication signals or supervisory signals around a failed multiple repeater section or damaged fiber optic cable segment.

FIG. 10B illustrates another table for determining a number of optical switches based on a number of inputs according to another embodiment.

In the table 1000*b*, the Z coefficient may correspond to the number of inputs and the number of outputs to the submarine optical communication recovery device that accounts for 2 unusable optical paths. Based on the value of Z, the number (#) of switches may be determined. For example, if there are 16 inputs as in the example of FIG. 4, the number of switches used to enable a redundant path that can be used in the bypass of the 2 unusable optical paths and provide a usable optical fiber to transmit optical communication signals or supervisory signals around a failed multiple repeater section or damaged fiber optic cable segment.

For the disclosed examples, other FPs in the optical communication system may be temporarily affected during the recovery, e.g., optical signal traffic may be interrupted, as the optical switches are configured to redirect the "bad" fiber optic. For example, transmitter/receiver (Tx-Rx) fiber pairs are reconfigured during recovery by potentially coupling a Tx with a different Rx. An optical add-drop multiplexer (OADM) is a device used in wavelength-division multiplexing optical communication systems for multiplexing and routing different channels of light into or out of a single mode fiber. If a fixed OADM is used, the configure of the OADM may be accounted for during implementation so that the submarine optical communication recovery device does not drop path-through optical fibers, and vice versa. If a reconfigurable OADM is used, the control system may reconfigure the OADM during recovery accordingly. Other technical features may be readily apparent to one skilled in the art from the following figures, descriptions, and claims.

Herein, novel and unique techniques, devices and systems for an improved submarine optical communication recovery are disclosed. The present disclosure is not to be limited in scope by the specific examples described herein. Indeed, other various examples of and modifications to the present disclosure, in addition to those described herein, will be apparent to those of ordinary skill in the art from the foregoing description and accompanying drawings.

Thus, such other examples and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A submarine optical communication recovery device, comprising:
   a plurality of inputs, wherein each input of the plurality of inputs is operable to connect to a respective optical fiber of a plurality of optical fibers of a submarine fiber optic cable, and a portion of the plurality of optic fibers carry optical signals and at least one optical fiber of the plurality of optical fibers is an unusable optical path that is unable to carry a usable optical signal;
   a plurality of outputs, wherein:
      each output of the plurality of outputs couples to another respective optical fiber, and
      a number of the plurality of outputs are designated as impaired outputs; and
   a plurality of optical switch modules operable to connect an input of the plurality of inputs coupled to the unusable optical path to an impaired output of a number of the impaired outputs, wherein a first portion of the plurality of optical switch modules are arranged in an input optical switching component, wherein each respective optical switch module of the plurality of optical switch modules includes a predetermined number of optical switches, and wherein the predetermined number of optical switches is three, each of the three optical switches including two inputs and two outputs.

2. The submarine optical communication recovery device of claim 1, wherein each respective optical switch module is operable to couple an input to a designated output that is connected to the one impaired output of the number of impaired outputs.

3. The submarine optical communication recovery device of claim 1, wherein each optical switch module includes an output designated for connection to the impaired output of the plurality of outputs.

4. The submarine optical communication recovery device of claim 1, wherein a second portion of the plurality of optical switch modules are arranged in an output optical switching component.

5. The submarine optical communication recovery device of claim 4, wherein the input optical switching component includes an equal number of the plurality of optical switch modules as the output optical switching component.

6. The submarine optical communication recovery device of claim 1, wherein the number of the impaired outputs is equal to at least two.

7. The submarine optical communication recovery device of claim 1, wherein the number of the impaired outputs is one.

8. The submarine optical communication recovery device of claim 1, further comprising:
   a loss equalizer operable to equalize optical signal losses between each optical fiber coupled to each input of the plurality of inputs.

9. The submarine optical communication recovery device of claim 8, wherein:
   a first portion of the plurality of optical switch modules are arranged in an input optical switching component,
   a second portion of the plurality of optical switch modules are arranged in an output optical switching component, and
   the loss equalizer is positioned between the input optical switching component and the output optical switching component.

10. A submarine optical communication signal repeater, comprising:
    an optical communication signal repeater operable to couple to respective fiber optic cable segments of a plurality of fiber optic cable segments, wherein the optical communication signal repeater is operable to amplify a respective optical signal transmitted by a respective optical fiber of the plurality of optical fibers;
    an optical communication recovery device; and
    a housing containing the optical communication signal repeater and the optical communication recovery device;
    wherein the optical communication recovery device includes a plurality of optical switch modules and is operable to: connect, in response to an optical communication signal failure in at least one optical fiber in a respective fiber optic cable segment, the at least one optical fiber to an output of an optical switch module of the plurality of optical switch modules, and the output of the optical switch module is designated as an impaired output, wherein a first portion of the plurality of optical switch modules are arranged in an input optical switching component, and
    wherein each optical switch module of the plurality of optical switch modules of the optical communication recovery device has a plurality of inputs and a plurality of outputs, and the plurality of inputs and the plurality of outputs are an equal number.

11. The submarine optical communication signal repeater of claim 10, wherein the optical communication signal failure is at least one failure of: a component of the optical communication signal repeater, one respective optical cable segment, or one respective optical fiber of the plurality of optical fibers.

12. The submarine optical communication signal repeater of claim 10, wherein a second set of the optical switch modules of the plurality of optical switch modules, different from the first set, is arranged as an output optical switching component.

13. The submarine optical communication signal repeater of claim 10, the optical communication signal repeater is operable to couple to an optical cable communication pathway including the plurality of fiber optic cable segments, wherein each segment of the plurality of segments of the fiber optic cable has a plurality of optical fibers.

14. The submarine optical communication signal repeater of claim 10, wherein the optical communication recovery device includes at least two impaired outputs.

15. The submarine optical communication signal repeater of claim 10, wherein the optical communication recovery device includes one impaired output.

16. The submarine optical communication signal repeater of claim 10, further comprising:
a loss equalizer operable to equalize optical signal losses between each optical fiber coupled to each input of a plurality of inputs to the optical communication recovery device.

17. The submarine optical communication signal repeater of claim 16, wherein:
a first portion of the plurality of optical switching modules are arranged in an input optical switching component,
a second portion of the plurality of optical switching modules are arranged in an output optical switching component, and
the loss equalizer is positioned between the input optical switching component and the output optical switching component.

18. An optical communication recovery system, comprising:
a fiber optic cable communication pathway including a plurality of fiber optic cable segments operable to transmit optical data signals, wherein the optical data signals include communication data signals and supervisory data signals, and at least one fiber optic cable segment of the plurality of fiber optic cable segments includes an unusable optical path;
a first optical signal repeater section coupled between a respective first segment and a respective second segment of the plurality of the fiber optic cable segments of the fiber optic cable communication pathway, wherein the first optical signal repeater section includes a first set of connections and a second set of connections coupled to a respective set of amplifiers; and
a submarine optical communication recovery device having a plurality of inputs and a plurality of outputs, wherein the submarine optical communication recovery device comprises a plurality of optical switch modules operable to connect to an unusable optical path to an input of the plurality of inputs and couple the unusable optical path to an impaired output of a plurality of outputs of the submarine optical communication recovery device, wherein a first portion of the plurality of optical switch modules are arranged in an input optical switching component, and wherein each optical switch module of the plurality of optical switch modules of the optical communication recovery device has a plurality of inputs and a plurality of outputs, and the plurality of inputs and the plurality of outputs are an equal number.

19. The optical communication recovery system of claim 18,
a second optical signal repeater section coupled between a respective first segment and a respective second segment of the plurality of the fiber optic cable segments, wherein the second optical signal repeater section includes a first set of connections operable to connect to respective first fiber optic cable segment and a second set of connections operable to connect to the respective second fiber optic cable segment.

* * * * *